United States Patent

Iten et al.

[15] 3,675,029
[45] July 4, 1972

[54] METHODS AND MEANS FOR MEASURING THE VELOCITIES OF LOCALIZED PORTIONS OF FLOWING MEDIA

[72] Inventors: Paul Dominik Iten, Oberrohrdorf; Francois Mottier, Zurich, both of Switzerland

[73] Assignee: Brown Boveri & Company Limited, Baden, Switzerland

[22] Filed: April 22, 1971

[21] Appl. No.: 136,385

[30] Foreign Application Priority Data

April 27, 1970 Switzerland ............................6247/70

[52] U.S. Cl. ...............................250/218, 331/94.5, 356/28
[51] Int. Cl. .........................................................G01n 21/26
[58] Field of Search ....................250/218; 331/94.5; 356/28, 356/29

[56] References Cited

UNITED STATES PATENTS

| | | | |
|---|---|---|---|
| 3,457,419 | 7/1969 | Rosa | 250/218 |
| 3,472,593 | 10/1969 | Drinkwater | 250/218 |
| 3,510,665 | 5/1970 | Goolsby | 250/218 |
| 3,511,227 | 5/1970 | Johnson | 250/218 |
| 3,532,427 | 10/1970 | Paine | 356/28 |
| 3,547,540 | 12/1970 | Shigemoto | 356/28 |
| 3,552,855 | 1/1970 | Crosswy | 356/28 |
| 3,584,956 | 6/1971 | Hines | 356/28 |

OTHER PUBLICATIONS

Measurement of Localized Flow Velocities With A Laser Doppler Flowmeter, J. W. Johnson Appl. Phys. Letter 8/15/65, pp. 77–78

Laser Doppler Detection Systems For Gas Velocity Measurement, R. M. Huffaker, Applied Optics Vol. 9, No. 5, pp. 1026–1039

Primary Examiner—James W. Lawrence
Assistant Examiner—D. C. Nelms
Attorney—Toren & McGeady

[57] ABSTRACT

The velocity of a localized portion of a fluid medium is measured by focusing a laser beam onto the point to be measured, and then, with a single lens focused on the point, transforming the resulting scattered light as well as the unscattered light into beams parallel to the axis of the lens. The back face of a plate angularly oriented to the axis of the lens reflects one of the beams toward the intersection of an other beam with the front face of the plate. The front face is a half mirror which passes the oncoming other beam and again reflects the already reflected beam. This superimposes the two beams. The composite beam is then detected by a photodetector. Suitable means indicate the resulting heterodyne frequency as a measure of the velocity of the medium.

7 Claims, 2 Drawing Figures

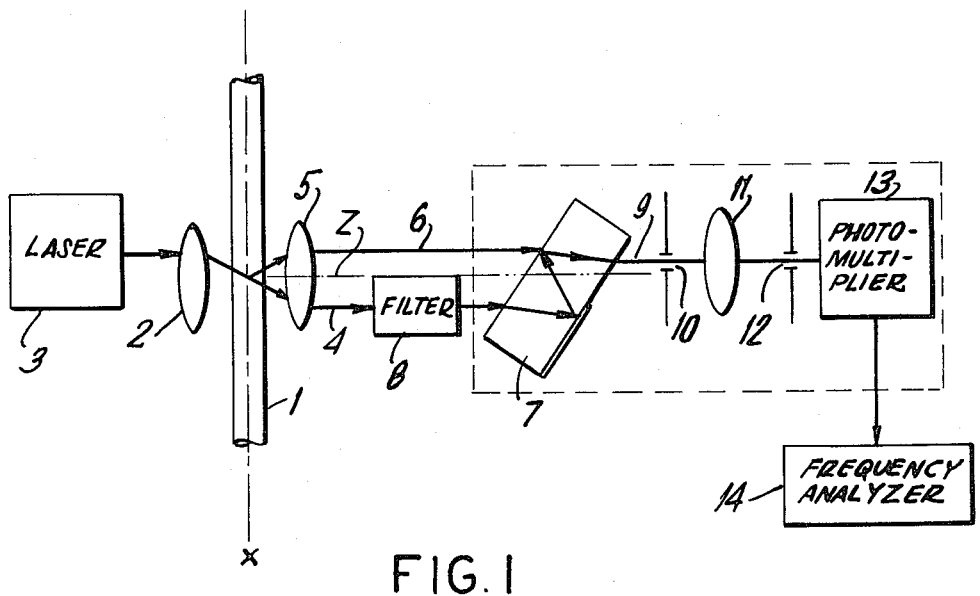
FIG. I
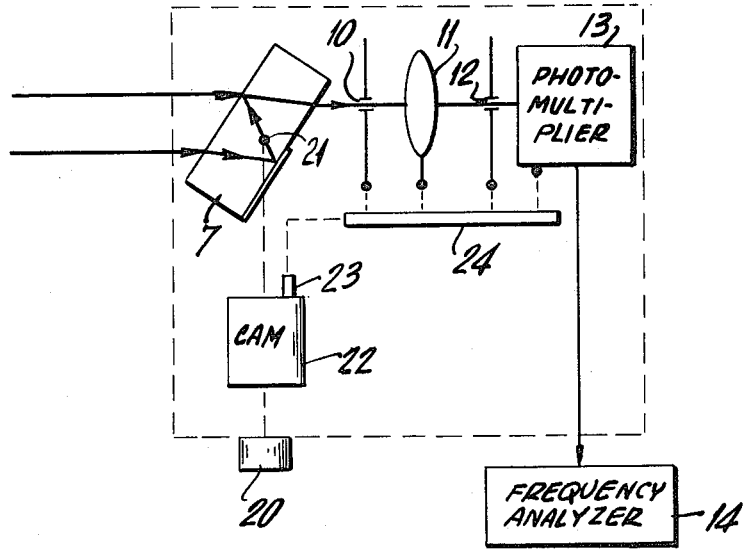
FIG. 2
INVENTORS
PAUL DOMINIK ITEN
FRANCOIS MOTTIER
BY
ATTORNEYS

METHODS AND MEANS FOR MEASURING THE VELOCITIES OF LOCALIZED PORTIONS OF FLOWING MEDIA

This invention relates to methods and means for measuring the localized velocities of flowing media, and particularly to laser Doppler velocimeters or LDVs which are used for microscopic investigations of velocity fields such as in boundary layer measurements in wind tunnels, or in the movement of gases, liquids and solid bodies.

Such laser Doppler velocimeters generally include a continuous wave laser beam focused on the point within the medium at which the velocity is to be measured. A part of the focused beam passes through the medium and another part is scattered. The moving particles of the medium which scatter the focused laser light subject the light to a frequency shift. This frequency shift is inversely proportional to the vacuum wave length of the laser light. The frequency shift is directly proportional to the index of refraction of the flowing medium and a component of the velocity of the scattering particles. This component depends upon the magnitude and the cosine of the direction of the velocity.

To measure this frequency shift optical means superimpose the beam formed by the light which passes unscattered through the medium onto a beam which is formed by light that is scattered by the particles of the medium. The unscattered beam and the scattered beam superimposed thereon are focused jointly on a point of a light detector to form a mixed signal of comparatively low frequency, namely a heterodyne signal. Depending upon the flow velocity, the frequency of the heterodyne signal has a value between about 100 Hz and 1 GHz. Details and embodiments of such a laser Doppler velocimeter are disclosed in the IEEE Journal of Quantum Electronics, 1966, pages 260–266.

Laser Doppler velocimeters, as compared to classical measuring devices such as Pitot tubes and the like, accomplish their beneficial results by measuring without mechanically contacting the media in the classical sense, and thus without disturbing the velocity field. Furthermore, they are capable of determining the distribution of velocities at various points with high spatial resolution.

However, because of the many degrees of freedom involved, adjustment of the optical system in known laser Doppler velocimeters presents considerable difficulties. This is especially so since in order to obtain maximum signal-to-noise ratios for the heterodyne signals, the vectors of the energy flows, that is to say the Poynting vectors, of the reference beam and the signal beam have to coincide.

An object of the present invention is to avoid the above mentioned disadvantages.

Another object of the invention is to furnish an easily adjustable apparatus of the above mentioned kind.

Still another object of the invention is to improve laser Doppler velocimeters.

According to a feature of the invention the above disadvantages are obviated and the above objects obtained in a system where a lens focuses a collimated laser beam onto a point in the moving medium, by positioning a second lens so that its focal plane intersects the focal plane of the first lens at the measuring point. The lens transforms light scattered from the focus by the moving medium and the unscattered light which passes through the moving medium into light bundles, rays, or beams which are recollimated and extend parallel to the optical axis of the second lens. Optical means, after superimposing a beam of unscattered light on a beam of scattered light so the two follow the same path and form a single composite beam, then produce a heterodyne signal from the composite beam. This signal is a measure of the velocity of the moving medium at the point at which it is measured. That is to say it is a measure of the localized or local velocity of the medium.

According to another feature of the invention the optical means includes a transparent parallel-faced plate in the path of the beams. The faces or face planes of the plate are inclined relative to the optical axis of the second lens. Reflective surfaces of these planes superimpose the beam composed of unscattered light upon the beam of scattered light. For simplicity, a beam, bundle or ray of unscattered light is herein called an unscattered light beam or an unscattered beam. Similarly, a beam, bundle or ray of scattered light is called a scattered light beam or scattered beam.

According to yet another feature of the invention the plane of the plate further from the second lens and in the path of a beam of unscattered light reflects internal rays. On the basis of its inclination relative to the axis of the second lens it directs the unscattered beam through the plate toward the intersection of a scattered light beam with the plane closest to the lens. At the intersection, an uncoated surface reflects a small fraction of the unscattered beam into the plate and refracts the intersecting scattered beam. The beams leave the intersection in the same direction. In this way a scattered beam and an unscattered beam are superimposed on each other to form a composite beam.

According to yet another feature of the invention the optical means includes an iris, diaphragm, or mask having an aperture located behind the plate. The aperture permits passage only of the superimposed mixed beam or bundle composed of the collinear scattered and unscattered beams. A third lens then focuses the composite beam on the aperture of a second iris. A light detector measures the intensity of the light which enters the second aperture.

By virtue of these features a few adjustments of the optical system are sufficient to obtain the desired result. The most important of these adjustments is to set the first two lenses so their focal planes intersect the point within the medium at which the velocity is to be measured. Alternately the first two lenses may be adjusted so their focal planes coincide. When the focal planes intersect at the point of measurement or coincide with each other, projection of collimated light onto the first lens causes the scattered light beam and the unscattered light beam to be recollimated and parallel to each other after they pass through the second lens.

According to another feature of the invention the optics are arranged so that they use scattered light which, relative to the optical axis of the second, leaves the medium symmetrical to the unscattered light or partial bundle or beam. By virtue of this feature, and the symmetrical construction resulting therefrom, wave front distortions by the image forming means are substantially obviated. With the optics arranged to use the symmetrically oriented scattered light, the second lens, which transforms the rays of the scattered light into bundles or beams running parallel to its optical axis, effectively serves to form images only with portions lying symmetrical to its center. For reasons relating to the production of lenses these symmetrically located portions have identical optical characteristics. Thus they also exhibit the same image forming errors, such as wave front distortions due to spheric abberations. Thus, if both partial bundles or beams are distorted or otherwise changed as they pass through the lens, both of the bundles or beams are subjected to identical distortions or changes. Thus, image forming errors have no influence upon the measuring results.

According to yet another feature of the invention an intensity attenuator is positioned in the path of the unscattered beam or partial bundle as it passes from the second lens.

According to another feature of the invention the attenuator includes an adjustable gray filter. The latter adjusts the optimum condition between the intensity of the scattered light beam or bundle and the unscattered light beam.

According to still another feature of the invention suitable means adjust the inclination of the plate and its planes relative to the axis of the second lens.

According to still another feature of the invention the plate, the first iris, the third lens, the second iris, and the light detector are grouped to form a mechanical unit. Mechanical means responding to the inclination of the planes of the plate toward the optical axis of the second lens displace the first iris and its aperture, the third lens, the second iris and its aperture, and the light detector in a direction perpendicular to the axis so that the composite beam always passes through the aperture of the first iris and the second one regardless of the inclination of the planes on the plate. This arrangement significantly simplifies adjustment of the optical system.

These and other features of the invention are pointed out in the claims. Other objects and advantages of the invention will become obvious from the following detailed description when read in light of the accompanying drawing.

BRIEF DESCRIPTION OF THE DRAWING

FIG. 1 is a block diagram illustrating an apparatus embodying features of the invention; and FIG. 2 is a block diagram illustrating details of a portion of the apparatus in FIG. 1.

In FIG. 1, a medium 1, whose velocity is to be measured at specified locations within the medium, flows in the direction $x$. A lens 2 focuses the coherent light emerging from a continuous wave laser 3 onto the point or location to be measured within the medium 1 so as to illuminate that point. As a result of the illumination unscattered light in the form of a partial bundle or beam 4 exits from the medium 1 toward a lens 5. A portion of the light is scattered in a number of directions. That portion of the scattered light which extends symmetrically to the unscattered light about the optical axis $z$ of the lens 5 is identified as a scattered bundle or partial bundle, or ray, or beam 6. This beam 6 also impinges on the lens 5. The lens 5 is adjusted so that its focal plane intersects the point at which the velocity is to be measured in the medium 1. More specifically, as shown in FIG. 1, the focal planes of the lens 2 and the lens 5 coincide with each other.

Both the unscattered light beam and the scattered light beam are recollimated by the lens 5. They leave the lens 5 parallel to the axis $z$ of the lens 5. The paths of these beams are symmetrical about the axis $z$. These two beams impinge upon a plate 7 having parallel faces. The plate is arranged to rotate within the $x$–$z$ plane about an axis perpendicular to the plane of the drawing. The plate superimposes the beam 4 upon the beam 6.

In order to perform this superimposition the plate 7 functions as a beam splitter. On its rear face opposite to the impinging light the plate 7 is partially mirrored. Specifically the lower portion of it is mirrored. The beam 4 is refracted by the plate 7, and as it impinges upon the rear face is reflected upwardly. The angle of the plate 7 about the axis perpendicular to the plane of the drawing is such that the interiorly reflected beam 4 intersects the front face of the plate 7 at the intersection of that front face with the beam 6. At the point of intersection the plate 7 is not mirrored to allow passage of the beam 6 past the face and into the plate and at the same time to reflect a small fraction of the beam 4 back into the interior of the plate. There is no coating necessary because any glass/air-boundary or air/glass-boundary reflects at least 4 percent of the incident power (see for example F.W. Sears, Optics, page 174, Addison-Wesley Publishing Company, Inc., Reading, Mass). The angle of the plate 7 is such that the beam 4 and beam 6 are now superimposed on each other and travel the same path through the plate 7 to the back face where they are again refracted as a composite beam 9.

An adjustable gray filter 8 between the lens 5 and the plate 7 adjusts the ratio of the optical intensities of the scattered beam 6 and the unscattered beam 4.

The composite beam 9 which exits from the plate 7 impinges upon an aperture 10 in a suitable iris. The aperture 10 cuts out all those rays which are not designated for further processing. Its diameter is approximately one millimeter and corresponds to the diameter of the composite beam. A control lens 11 focuses the light which leaves the aperture 10 onto the aperture 12 of a second iris. The lens 11 forms an image corresponding to the points to be measured in the medium 1 at the aperture 12. The diameter of the aperture 12 thus determines the size of the area or point in the medium to be measured. The diameter of the aperture 12 is preferably of a magnitude of approximately $10\mu m$.

A photomultiplier 13 measures the intensity of the light passing through the aperture 12 and converts it into an electrical potential. A frequency analyzer 14 then analyzes the frequency for the purpose of determining the speed of the moving medium at the portion to be measured. Photomultipliers such as 13 and frequency analyzers such as 14 as well as other devices for performing their functions in this environment are well known. For example, the beforementioned article in the IEEE Journal of Quantum Electronics, Vol. QE-2 No. 8 of August 1966, pages 260–266 describes a photomultiplier and a corresponding readout system for the purpose of measuring the velocities of flowing media.

The quality of velocity measurements in this environment is determined by the adjustment of the various members. The focal plane of the first lens 2 is adjusted so as to intersect the point to be measured within the medium 1. The second lens 5 is adjusted so its focal plane also intersects this point. On the other hand it may be adjusted so as to coincide with the focal plane of the first lens 2. The latter occurs, for example, if the optical axis of the two lenses 2 and 5 coincide.

A second adjustment operation resides in turning the plate 7 about a pivot in the $x$–$z$ plane. This pivot lies along an axis perpendicular to the plane of the drawing. This adjustment determines the direction of the desired scattered light beam leaving the medium 1. Subsequently the iris with the aperture 10, the lens 11 and the iris with the aperture 12 as well as the photomultiplier 13 must be moved parallel to the $z$ axis.

The last mentioned adjustment, namely turning of the plate 7 and parallel displacement of the iris with the aperture 10, the lens 11, the iris with the aperture 12, and the photomultiplier 13 is simplified by building the parts together into a unit as shown by the dotted line in FIG. 1. Within that unit, means are provided which respond to turning of the plate 7 within the $x$–$z$ plane and about a pivot perpendicular to the plane of the drawing by displacing the iris with the aperture 10, the lens 11, the iris with the aperture 12, and the photomultiplier 13, parallel to each other simultaneously. The setting member for the plate may then be calibrated directly into degrees of angles which correspond to the angle at which the scattered light beam to be measured leaves the medium 1.

FIG. 2 illustrates the apparatus for simultaneous movement of the plate 7 and the irises as well as the lens 11 and the photomultiplier 13. Here a knob 20 turns the plate 7 about a pivot 21. While turning the plate 7, the knob 20 also turns a cam 22 so that a cam follower 23 moves a bar 24 that simultaneously shifts the irises as well as the lens 11 and the photomultiplier 13 simultaneously up and down. Other systems such as servo-mechanisms may be used for causing cooperation and coaction between the plate 7 and the remainder of the elements within the box so as to provide a path for the beam 9 from the plate 7 to the photomultiplier 13.

The term iris as used herein is used in the sense of any diaphragm having an opening whether it be adjustable or not. The apertures 10 and 12 formed by the irises may or may not be adjustable depending upon the particular needs of the measuring system.

The velocities to be measured at any particular point or localized area are referred to herein and in the claims as the local velocities. It will be understood by this term that it refers to the velocity of the medium at any particular point at which the velocity is measured.

It will be noted that the tilted plate 7 has the effect of reflecting the beam 4 twice and subjecting it twice to refraction. In this way the beam 4 is shifted parallel to its original path by a distance determined by the angle of the plate 7. The angle of the plate 7 is such as to shift the beam 4 so that it coincides with the beam 6 which the plate 7 subjects twice to refraction. The beam 6 is one of many scattered beams which propagates parallel to the beam 4. It is the beam that left the point being measured symmetrically with the beam 4 relative to the axis $z$. It thus is equidistant with the beam 4 relative to the axis $z$. In this way one measures the $x$-component of the velocity which is the only velocity component in a cylindrical tube.

While an embodiment of the invention has been described in detail, it will be obvious to those skilled in the art that the invention may be embodied otherwise without departing from its spirit and scope.

What is claimed is:

1. An apparatus for measuring local velocities of a flowing medium, comprising first lens means for focusing a laser beam into the medium onto a point at which the velocity is to be measured so that a part of the light of the laser beam passes unscattered through the medium and a part of the light of the laser beam is scattered, an optical means for superimposing the unscattered light onto a portion of the scattered light from the focus; said optical means including second lens means in the path of the scattered and the unscattered light and having a focal plane which intersects the focal plane of the first lens means at the point at which the velocity is to be measured for transforming a portion of the scattered light and a portion of the unscattered light into a scattered light beam and an unscattered light beam which extend parallel to the optical axis of said second lens means, beam splitter means including an angularly adjustable reflecting plate in the path of said light beams for superimposing one of said light beams onto the other of said light beams and forming a composite beam which defines a heterodyne frequency, an electrical light sensitive means responding to the composite beam for producing an indication corresponding to the heterodyne frequency.

2. An apparatus as in claim 1, wherein said light sensitive means comprises first aperture forming means in the path of the light emerging from said beam splitter means for passing only the composite beam, third lens means located in the path of the composite beam emerging from said first aperture forming means for focusing the composite beam, second aperture forming means for forming an aperture at the focus of said third lens means, and a light detector in the path of the composite beam emerging from said second aperture forming means for measuring the intensity of the light passed through said second aperture forming means.

3. An apparatus as in claim 1, wherein said optical plate in said beam splitter means includes a first planar face and a second planar face parallel to the first planar face, said planar faces being angular relative to the axis of said second lens means, said first planar face being closer to said first lens means than said second planar face, reflecting means on said second planar face in the path of one of the light beams for interiorly reflecting the one of the light beams toward said first planar face, said first planar face being in the path of the other of the light beams, the angle of said faces being inclined relative to the axis of said second lens means so that said reflective portion of said second face reflects the one of said light beams to the intersection of the other of said light beams with said first planar face, said second planar face at the intersection of said beams being partially reflective and partially non-reflective so that the one of said light beams is reflected interiorly of the plate in one direction and the other of the light beams is refracted by the plate in the same direction.

4. An apparatus as in claim 3, wherein the one of said light beams is the unscattered light beam and the other of said light beams is the scattered light beam.

5. An apparatus as in claim 1, wherein said optical means includes an optical attenuator positioned in the path of the light beam between said second lens means and said beam splitter means.

6. An apparatus as in claim 5, wherein said attenuator means is positioned in the path of the unscattered light beam.

7. An apparatus as in claim 3, wherein said light sensitive means comprises pivot means for changing the angle of said plate relative to the axis of said second lens means, said light sensitive means further including a light detector in the path of said composite beam, and moving means coupled to said pivot means for moving said light detector means into the path of said composite beam in response to the movement of the angle of said plate.

* * * * *

UNITED STATES PATENT OFFICE
CERTIFICATE OF CORRECTION

Patent No. 3,675,029          Dated July 4, 1972

Inventor(s) Paul Dominik Iten and Francois Mottier

It is certified that error appears in the above-identified patent and that said Letters Patent are hereby corrected as shown below:

In claim 3, line 1, the term "optical plate" should read --reflecting plate--

Signed and sealed this 27th day of November 1973.

(SEAL)
Attest:

EDWARD M. FLETCHER, JR.　　　　　RENE D. TEGTMEYER
Attesting Officer　　　　　　　　Acting Commissioner of Patents